F. M. SIGVART.
METHOD AND APPARATUS FOR MAKING VARICOLORED ARTICLES FROM PLASTIC MATERIALS.
APPLICATION FILED JUNE 20, 1919.

1,372,164. Patented Mar. 22, 1921.

INVENTOR
Frank M. Sigvart,
BY
C. P. Goepel
ATTORNEY

UNITED STATES PATENT OFFICE.

FRANK M. SIGVART, OF BROOKLYN, NEW YORK.

METHOD AND APPARATUS FOR MAKING VARICOLORED ARTICLES FROM PLASTIC MATERIALS.

1,372,164.   Specification of Letters Patent.   Patented Mar. 22, 1921.

Application filed June 20, 1919. Serial No. 305,655.

*To all whom it may concern:*

Be it known that I, FRANK M. SIGVART, a citizen of the United States, and a resident of the borough of Brooklyn, county of Kings, city and State of New York, have invented certain new and useful Improvements in Methods and Apparatus for Making Varicolored Articles from Plastic Materials, of which the following is a specification.

It is the primary object of the present invention to provide a very simple method which may be performed in an expeditious manner, to provide an article from materials of an initially plastic nature, which, when completed, has a plurality of sections of relatively different colors.

It is also another object of my invention to provide an improved means or apparatus for successfully practising the method above referred to and including means adapted to operate upon masses of differently colored plastic materials successively placed within a suitable mold to form the materials into annular wall sections arranged in superposed relation and homogeneously united to thereby produce an article having a varicolored wall of unbroken continuity.

The invention has for a further general object to provide a method and apparatus as above characterized, whereby articles such as electric light globes, display bottles, etc., may be manufactured and sold at relatively small cost.

Having the aforementioned objects in view, the present invention comprehends certain novel and improved combinations of mechanical elements, and the structural characteristics thereof, as will be more fully developed in the following description and subsequently incorporated in the subjoined claims.

In the accompanying drawing, I have illustrated one embodiment of apparatus which may be employed for carrying out the several steps of the improved method and therein similar reference characters designate corresponding parts throughout the several views, and in which—

Figure 1:
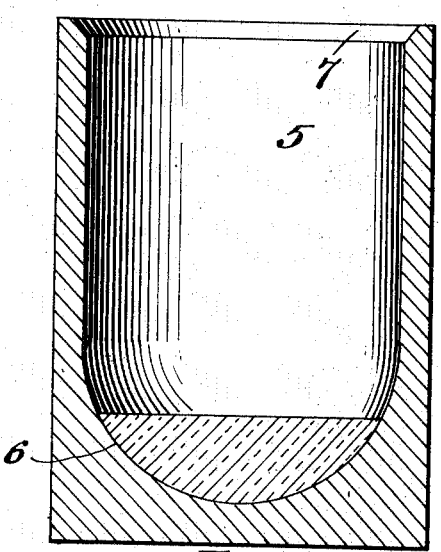
Figure 1 is a vertical sectional view through a mold structure showing a mass of molten glass or other plastic material arranged therein.

Referring in detail to the drawing, 5 designates the mold body, which may be of any desired form and proportions, but as herein shown is cylindrical in shape and provided with an interior rounded or concave bottom face 6. This mold is made of cast iron, though if desired, a suitable refractory material may be employed. The inner upper edge of the mold wall is preferably beveled as at 7 so as to readily direct the plunger guide to be presently referred to within the mold.

In forming the article by means of my improved method, I employ a tubular or hollow cylindrical guide sleeve upon the upper end of which an annular head or flange 9 is formed. This head is provided with a radially extending handle 10.

The sleeve 8 guides the plunger or pestle 11 into the mold 5. This plunger at its upper end is formed with an annular flange 12 and a suitable hand hold 13 whereby the plunger may be readily grasped and inserted within or removed from the mold.

A plunger guide ring 14 is also provided which is adapted to be substituted for the sleeve 8 in the final molding operation, said ring having an internal diameter which is the same as the internal diameter of the sleeve 8 and being provided with a suitable handle 15.

Figure 2:
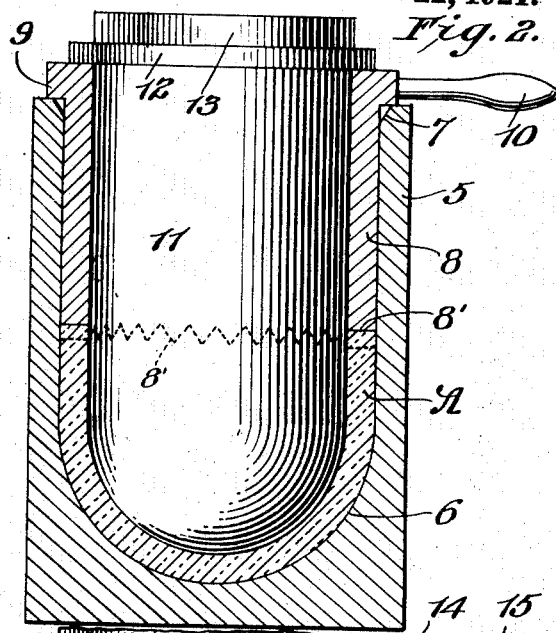
Fig. 2 is a similar view showing the plunger guide and plunger extending into the mold, the latter having operated upon the molten glass to form the lower section of the article.
Figure 3:
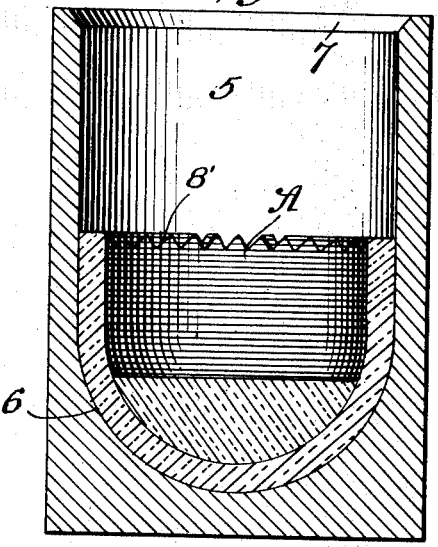
Fig. 3 is a view similar to Fig. 1 showing the second mass of molten glass arranged in the mold preparatory to the final molding operation.
Figure 4:
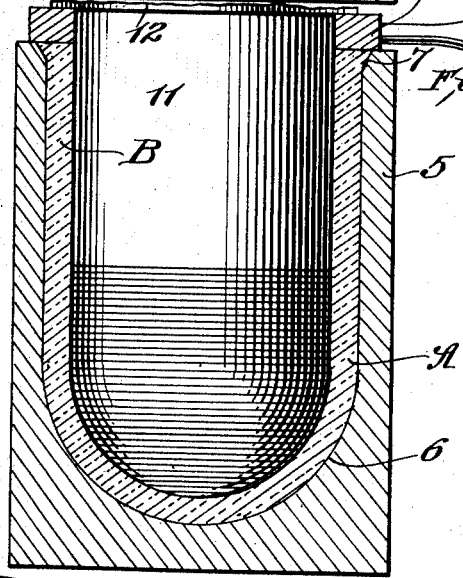
Fig. 4 is a vertical section showing the plunger guide ring in position upon the upper end of the mold and the plunger disposed therethrough and having operated upon the second plastic mass to extrude the same whereby the upper section of the article is formed.
Figure 5:
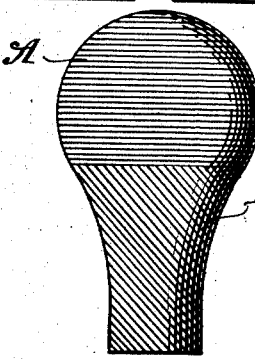
Fig. 5 is a side elevation of the completed article.

In the molding of the article, a quantity of molten glass or other plastic material is placed upon the curved bottom wall 6 of the mold 5, said material collecting at the center of the mold. The sleeve 8 is now inserted downwardly into the upper end of the mold as seen in Fig. 2 and it will be noted that this sleeve is of a length approximately equivalent to one-half of the mold depth. The plunger 11 is then inserted through the sleeve 8 and its lower rounded end 11' which is substantially concentric with the rounded bottom face 6 of the mold, is engaged upon the molten glass. The plunger is forced downwardly so that the pressure thereof upon the glass will act to extrude the same outwardly and upwardly into the space between the lower portion of the plunger and the surface of the mold wall. This distribution of the plastic material is substantially uniform so that the material will be tightly compressed or compacted between the mold wall, the peripheral surface of the plunger and the lower end face of the sleeve 8. As shown in Fig. 2, the lower end of the sleeve is preferably serrated as at 8' and of course the upper end of the formed section of the article will assume the same serrated shape. The mold is then permitted to cool after which the plunger and the cylindrical guide 8 are removed. The guide ring 14 is now arranged upon the upper end of the mold and a second mass of molten glass from which the upper section of the article is to be formed and which differs in color from the lower section thereof is deposited within the mold upon the rounded bottom portion of the lower section A of the article. The plunger 11 is now again inserted downwardly through the ring 14 into the mold and exerts a pressure upon this second mass of glass and thereby extrudes the same outwardly and upwardly and into the space between the upper portion of the plunger and the mold wall which was formerly occupied by the guide sleeve 8. Here the glass will be closely compressed and will unite with the serrated upper edge of the section A to thereby produce an upper wall section B which is practically a continuation of the lower section A, but of a contrasting color. It is of course understood that the mold is suitably heated during the molding of the upper section B so that there will be a homogeneous molecular union of the two sections with each other. The mold is now permitted to cool so that the plastic material will set and harden. The guide ring 14 is removed and the article having the contrasting color sections may then be removed from the mold and heated and shaped by blowing or other operations now employed in the art, into a globe, display bottle or any other desired article. The wall of the article, is of uniform thickness throughout and if desired the upper section of the article may be formed of an opaque plastic material while the lower section is transparent, or vice versa.

From the foregoing description considered in connection with the accompanying drawing, my improved method as well as the apparatus which I have devised for practising the same, may be clearly and fully understood. By means of the present invention such vari-colored articles may be expeditiously produced without waste of material and with relatively little labor. I have above referred to an article consisting of two vari-colored sections but it is manifest of course, that if desired a mold of larger size may be used and an article having a larger number of the sections of contrasting colors produced by a repetition of the operations above referred to.

In the preceding description and the accompanying drawing I have disclosed one practical embodiment of the invention, which, however, may likewise be exemplified in numerous alternative constructions. Accordingly the invention as herein claimed is to be considered as inclusive of all legitimate equivalents for the various elements employed as well as other contemplated arrangements thereof, which may satisfactorily accomplish the desired results.

I claim:

1. An apparatus of the character described including a mold, a sleeve placed in the mold having its inner end spaced from the bottom portion of the mold, a plunger moving through the sleeve and extending into the inner portion of the mold to form with the mold walls inward of the inner end of the sleeve a mold space into which a batch of molten glass previously introduced into the mold will be forced, a ring adapted to coöperate with the top of the mold and the plunger to form a cavity after the first batch of glass has been molded and subsequent to the removal of the sleeve and adapted to guide the plunger a second time into the mold to distribute a second batch of glass against those portions of the mold walls previously occupied by said sleeve whereby the second batch of glass may be arranged in continuation of the first-mentioned batch and have its adjacent edges incorporated therewith.

2. An apparatus of the character described comprising a mold adapted to receive a batch of glass, means for distributing such batch of glass against the mold walls at the inner portion of the mold and causing the batch to assume a definite desired shape, means for confining the batch at its outer edge during the distribution thereof, said means adapted to be removed after the hardening of the first batch, and means coöperating with the top for closing the same and forming a cavity therein and for guiding the glass distributing means a second time within the mold to distribute a second batch of glass of a different character against the mold walls and in the space previously occupied by said confining means whereby to mold the second batch of glass in continuation of the first batch.

3. The herein described method of forming glass articles in a single mold and with a single size and shape of plunger which consists in pressing a batch of glass by a plunger into the lower end of the mold against the wall thereof and with the upper portion of the mold wall covered, and subsequently pressing a second batch of glass by a plunger of the same shape and size into the same mold above the first pressed batch of glass and with the upper portion of the mold wall uncovered.

In testimony that I claim the foregoing as my invention, I have signed my name hereunder.

FRANK M. SIGVART.